(12) United States Patent
Argemi Samso et al.

(10) Patent No.: US 11,912,441 B2
(45) Date of Patent: Feb. 27, 2024

(54) RETURN TO BASE SPACE LAUNCH VEHICLES, SYSTEMS AND METHODS

(71) Applicant: PANGEA AEROSPACE, S.L., Barcelona (ES)

(72) Inventors: Adria Argemi Samso, Barcelona (ES); Rasmus Bergstrom, Barcelona (ES); Federico Rossi, Barcelona (ES); Nicola Palumbo, Barcelona (ES)

(73) Assignee: PANGEA AEROSPACE, S.L., Barcelona (ES)

(*) Notice: Subject to any disclaimer, the term of this patent is extended or adjusted under 35 U.S.C. 154(b) by 293 days.

(21) Appl. No.: 17/290,699

(22) PCT Filed: Nov. 5, 2019

(86) PCT No.: PCT/EP2019/080235
§ 371 (c)(1),
(2) Date: Apr. 30, 2021

(87) PCT Pub. No.: WO2020/094640
PCT Pub. Date: May 14, 2020

(65) Prior Publication Data
US 2022/0017242 A1    Jan. 20, 2022

(30) Foreign Application Priority Data
Nov. 6, 2018 (EP) ..................................... 18382788

(51) Int. Cl.
*B64G 1/62* (2006.01)
*B64G 1/00* (2006.01)
*B64G 1/42* (2006.01)

(52) U.S. Cl.
CPC ............... *B64G 1/62* (2013.01); *B64G 1/002* (2013.01); *B64G 1/425* (2013.01)

(58) Field of Classification Search
CPC .................................. B64G 1/002; B64G 1/62
See application file for complete search history.

(56) References Cited

U.S. PATENT DOCUMENTS

| 3,412,807 A | 11/1968 | Kretz |
| 6,158,693 A | 12/2000 | Mueller et al. |

(Continued)

FOREIGN PATENT DOCUMENTS

| CA | 2428883 A1 | 11/2004 |
| DE | 1456145 A1 | 3/1969 |

(Continued)

OTHER PUBLICATIONS

International Search Report and Written Opinion for International PCT Application No. PCT/EP2019/080235, 10 pages, dated Feb. 25, 2020.

*Primary Examiner* — Brady W Frazier
*Assistant Examiner* — Shanna Danielle Glover
(74) *Attorney, Agent, or Firm* — Squire Patton Boggs (US) LLP

(57) ABSTRACT

A stage for a space launch vehicle is provided. The space launch vehicle has a main body including a first end and a second end, and defines a central longitudinal axis between the first end and the second end. The stage comprises a stage rocket engine arranged at or near the first end of the stage to propel the launch vehicle vertically upwards at take-off. The stage furthermore comprises a plurality of fans for providing lift during a landing procedure of the stage, wherein the fans have a rotational axis arranged substantially perpendicular to the central longitudinal axis. Also provided are space launch vehicles and methods for transporting a payload into space.

20 Claims, 4 Drawing Sheets

(56) References Cited

U.S. PATENT DOCUMENTS

| | | | |
|---|---|---|---|
| 8,047,472 | B1 | 11/2011 | Brand et al. |
| 8,408,497 | B2 | 4/2013 | Boelitz et al. |
| 8,678,321 | B2 | 3/2014 | Bezos et al. |
| 9,114,892 | B1* | 8/2015 | Ball ..................... B64G 1/402 |
| 9,174,749 | B2 | 11/2015 | Gogdet et al. |
| 9,457,918 | B2 | 10/2016 | Hand |
| 9,580,191 | B2 | 2/2017 | Featherstone et al. |
| 9,676,498 | B1 | 6/2017 | Hand |
| 10,569,908 | B1* | 2/2020 | Coyne ................... B64G 1/002 |
| 2008/0169375 | A1* | 7/2008 | Ishikawa ................ F02C 3/107 |
| | | | 244/12.1 |
| 2010/0314497 | A1* | 12/2010 | Boelitz ................. B64G 1/002 |
| | | | 701/99 |
| 2010/0326045 | A1 | 12/2010 | Lai |
| 2011/0017872 | A1 | 1/2011 | Bezos et al. |
| 2016/0023754 | A1 | 1/2016 | Wiegand |
| 2017/0349301 | A1 | 12/2017 | Bezos et al. |
| 2019/0135438 | A1* | 5/2019 | Stephens, Jr. ............ B64G 1/62 |

FOREIGN PATENT DOCUMENTS

| | | |
|---|---|---|
| EP | 1846296 B1 | 10/2007 |
| EP | 2 367 722 B1 | 1/2016 |
| RU | 2053168 C1 | 1/1996 |

\* cited by examiner

RETURN TO BASE SPACE LAUNCH VEHICLES, SYSTEMS AND METHODS

CROSS-REFERENCE TO RELATED APPLICATIONS

The present application is a National Stage filing under 35 U.S.C. § 371 of International Patent Application No. PCT/EP2019/080235, filed Nov. 5, 2019, which claims the benefit of and priority to European patent application EP 18 382 788.0 filed on Nov. 6, 2018, both applications are incorporated by reference herein in their entirety for all purposes.

The present disclosure relates to launch vehicles, and particularly relates to a stage of launch vehicles, e.g. a first stage that can return to land on earth. The present disclosure further relates to launch vehicles of which a part can return to earth after launch. The present disclosure also relates to systems and methods for transporting a payload into space.

BACKGROUND

A satellite may be regarded as an artificial artefact which has been placed into orbit around the earth. Satellites may be used for military purposes or non-military purposes. Particularly, non-military satellites may be used for telecommunication, environmental and meteorological monitoring, earth or space observation and many other purposes.

Satellite orbits vary greatly, depending on the purpose of the satellite, and include low earth orbit, polar orbit, and geostationary orbit among others.

There is an increasing trend in the reduction of satellite size. By reducing the size and weight of satellites (e.g. below 500 kg), the cost can be reduced, as more of them could be included in a launch vehicle on a single mission. Also, smaller satellites, in larger numbers, may be more useful to e.g. gather data and/or for communication purposes than a small number of large satellites. Microsatellites are sometimes defined as satellites having a mass of between 10 and 100 kg. Nanosatellites are sometimes defined as satellites having a mass between 1 and 10 kg.

Nowadays, smaller satellites e.g. microsatellites or nanosatellites usually piggyback on a launch vehicle that is used to bring a larger satellite into orbit. The smaller satellites may thus be regarded as a secondary payload for that launch vehicle.

Launch vehicles to transport satellites to their orbit, i.e. carrier rockets, have traditionally been made for a single mission. They are used only once and destroyed or abandoned during the flight.

A well known exception to the single use is the space shuttle. The space shuttle has been used to return to earth and land in a manner that is very similar to the way an aircraft lands. However, the design of the space shuttle has been proven to be prohibitively complex and expensive.

More recently, further attempts have been made to reduce the cost of launching a payload and this has led to reusable launch systems, in which part of the launch vehicle is recovered and reused for another flight. Possibly, the most well-known example of a re-usable first stage of a launch vehicle is being developed commercially by the company SpaceX™. Falcon 9 is a two-stage rocket designed and manufactured by SpaceX™ for the transport of satellites into orbit.

In the known reusable launch vehicles under development, the first stage both takes off and lands substantially vertically. I.e. the rocket engine of the first stage is ignited to slow down the fall of the vehicle towards earth and thereby land. The first stage rocket engine is also ignited during re-entry. The exhaust plume from the reentry burn forces the atmospheric compression that creates reentry heat to occur away from the rocket.

Even though Falcon 9 has been used successfully, the maneuvering required for re-entry and landing is very complex and technologically very challenging. This leads to a high development cost.

US 2011/017872 discloses launch vehicle systems and methods for landing and recovering a booster stage and/or other portions thereof on a platform at sea or on another body of water. In one embodiment, a reusable space launch vehicle is launched from a coastal launch site in a trajectory over water. After booster engine cutoff and upper stage separation, the booster stage (the first stage) reenters the earth's atmosphere in a tail-first orientation. The booster engines are then restarted and the booster stage performs a vertical powered landing on the deck of a pre-positioned sea-going platform. It relies on similar maneuvers as the Falcon 9 and therefore suffers from the same drawbacks.

The present disclosure provides examples of systems and methods that at least partially resolve some of the aforementioned disadvantages.

SUMMARY

In a first aspect, a stage for a space launch vehicle is provided having a main body including a first end and a second end, and defining a central longitudinal axis between the first end and the second end. The stage comprises a stage rocket engine arranged at or near the first end of the stage to propel the launch vehicle, and the stage further comprises a plurality of fans for providing lift during a landing procedure of the first stage. The fans have rotational axes substantially perpendicular to the central longitudinal axis.

According to this aspect, the plurality of fans may be used for landing the stage of the space launch vehicle and thus make the stage reusable for another mission. This simplifies the landing procedure and makes it more reliable and can lead to a reduction of cost.

The fans may have individually different fan axes. The fan axes do not need to be exactly perpendicular to the central longitudinal axis, but maybe e.g. within a range of −20° to +20° with respect to the normal, and preferably within a range of −15° to +15°.

A stage of a launch vehicle as used herein may be understood as a part of a launch vehicle that is configured to be separated from further parts of the launch vehicle and has an independent propulsion system. Launch vehicle stages may be in tandem arrangement or parallel arrangement.

In typical implementations, the first stage of the launch vehicle may be provided with the return to base capability, but in other implementations a second stage (or both a first and a second stage) may be provided with the fans for landing.

The fans may be turbofans, turboprops, propfans, propellers or ducted fans. All these propulsion arrangements can be used for a landing in a substantially horizontal orientation. Ducted fans as used in the present disclosure may be regarded as any propulsion arrangement whereby a mechanical fan or propeller, is mounted within a substantially cylindrical duct. The duct can reduce losses in thrust from the tips of the fans. The shape of the duct may be adapted to affect the velocity and pressure in the air flow through the fan. In preferred examples, the ducts may have a length that is at least 25% of the diameter of the fan, or at least 50% of the diameter of the fan, and preferably at least 100% of the fan. Ducted fans offer a high exhaust velocity, and a high Thrust-to-Weight ratio.

The plurality of fans may be electrically powered.

In some examples, the plurality of fans includes a first row of fans arranged side by side and a second row of fans arranged side by side, wherein the first and the second rows are substantially parallel to the central longitudinal axis. By having rows of fans, the amount of fans and therefore potential lift at landing can be increased without prohibitively increasing the cross-sectional area of the launch vehicle.

In some examples, the first row of fans and the second row of fans are arranged in diametrically opposite positions of the main cylindrical body. The resulting shape of the launch vehicle may be particularly useful for re-entry. When re-entry occurs with the launch vehicle in a horizontal orientation (i.e. substantially perpendicular to the orientation at take-off), the shape resembles the shape of a re-entry capsule.

In some examples, not all the fans of the plurality of fans have the same size and/or rated performance. E.g. some of the fans may be used mainly or exclusively for control and steering purposes. These fans might me smaller and less powerful than other fans that are mainly or exclusively used for providing lift. The smaller or less powerful fans which may be used for control and steering may be provided further away from the centre of gravity of the stage of the launch vehicle that is to return to base.

In some examples, the stage of the launch vehicle may further comprise one or more batteries for powering the fans, and wherein the batteries are arranged at or near a second end of the first stage. Batteries can represent a significant weight, and there is a tendency in space flight to reduce the weight of vehicles and payload as much as possible. By arranging the batteries at the second end (opposite to the first end where the rocket engine is arranged), the centre of gravity when landing can be located closer to the geometrical centre of the first stage which can improve flight control.

In an alternative example, a battery or group of batteries may be used for powering the fans and the propellant pumps. During a landing procedure when the fans are to be powered, the propellant pumps will not be needed. The same (group of) batteries may thus be used at one stage of the flight for powering the propellant pumps and at another stage of flight for powering the fans. An aspect of this arrangement is that a turbo-pump driven by exhaust gases from the rocket engine may be dispensed with.

In some examples, a battery, a group of batteries or all batteries may be arranged such that they can move within the stage of the launch vehicle. In one example, one or more batteries may be slidably arranged. In other examples, one or more batteries may have swiveling capability. Displacing the mass (by swiveling or sliding or otherwise) of one or more of the batteries can affect the centre of gravity and thereby control an orientation and/or angle of attack of the vehicle in flight.

In some examples, the main power conductors for the propellant pump and/or for the electrically powered fans might form part of the load bearing structure.

In some examples, cryogenic fuel may be used for cooling batteries and electrical power conductors. I.e. fuel lines may be arranged such that heat exchange with the batteries or electrical power conductors can take place.

In some examples, when (part of the) batteries have been used up, these batteries may be discarded in flight to reduce the weight of the stage of the launch vehicle.

In some examples, the stage of the launch vehicle may further comprise one or more fan covers to cover the fans at take-off. The fans are thereby covered during part of the flight and may only be uncovered when needed. Drag may be reduced.

In some examples, the fan covers are configured to be discarded during flight. In some examples, a controlled explosion mechanism may be used for detaching the fan covers. Pyrotechnic fasteners can form a reliable mechanism for detaching the fan covers. Other examples may include e.g. a pneumatic separation system, or a motorized deployment mechanism in which covers are rotated and/or displaced to uncover the fans.

In some examples, the stage of the launch vehicle may further comprise a control for controlling the plurality of fans, wherein the control is configured to separately control different groups of fans. A multicopter control can be established this way. In some of these examples, the stage of the launch vehicle may comprise a control for controlling the plurality of fans, wherein the control is configured to separately control four groups of fans, and wherein the four groups of fans are defined by four quadrants with respect to a centre of gravity of the first stage during the landing procedure. By defining four quadrants with individual control, a control that is very similar to a quadcopter can be established. A quadcopter can provide the lift for controlled flight and landing and can provide moments around all axes of the vehicle. In some of these examples, two groups of the fans may be driven to rotate in one direction, whereas the other two groups may be driven to rotate in the opposite direction to substantially cancel out gyroscopic forces from the different fans applied to the stage of the launch vehicle.

In some examples, further flight control and stability may be added to the first stage by including features such as a decelerator (e.g. a parachute or ballute), fins, or other aerodynamic control surfaces.

In a further aspect, a space launch vehicle comprising a first stage according to any of the herein disclosed examples is provided.

In some examples, the space launch vehicle may comprise a second stage and a second stage engine. In further examples, a third and further stages may be provided. The second and further stages may not have return to base capability. A payload may be arranged within the second or further stages. In some implementations, a payload may also be arranged in the stage of the launch vehicle that is configured to return to base.

In a further aspect, a system for space transportation including a space launch vehicle according to any of the examples herein described and further comprising a landing platform is provided.

In yet a further aspect, a method for transporting a payload to space is provided. The method comprises providing a space launch vehicle comprising a first stage according to any of the examples disclosed herein. The method further comprises arranging the payload in the space launch vehicle, launching the space launch vehicle by igniting the rocket engine, directing the first stage to descend and landing the first stage by powering the fans.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1A:
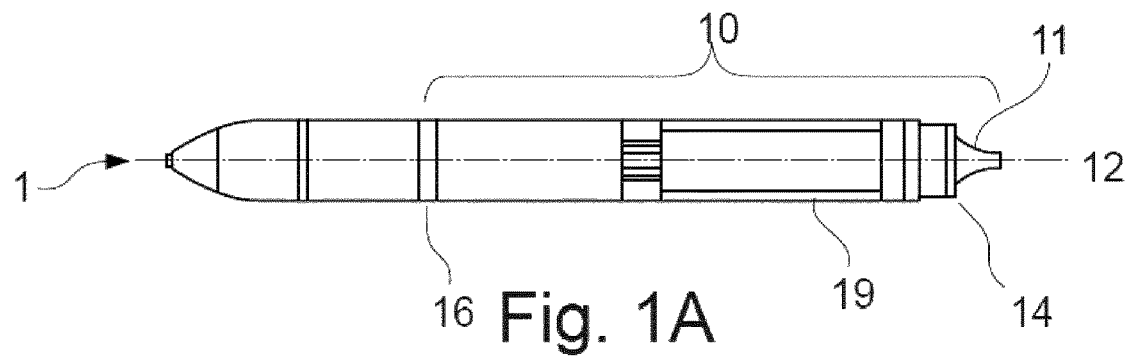
FIGS. 1A-1E schematically illustrate different views of an example of a first stage for a space launch vehicle and of a space launch vehicle.

In these figures the same reference signs have been used to designate the same elements.

FIGS. 1A-1E schematically illustrate different views of an example of a first stage for a space launch vehicle and of a space launch vehicle. The space launch vehicle according to this example may have a weight of around 20 tonnes and may be capable of transporting a payload of approximately 150 kg. A launch vehicle 1 according to this example comprises a first stage 10 and a second stage 30. The first stage 10 has a first end 14 and a second end 16, and a central longitudinal axis 12 and in this example forms a reusable stage of the space launch vehicle.

At or near the first end 14, a first stage rocket engine 11 is provided. In this specific example, an aerospike engine, and particularly an aerospike engine with a toroidal combustion chamber is provided. An aspect of using an aerospike engine is that the engine can maintain its aerodynamic efficiency across a wide range of altitudes. However, in other examples, different rocket engines may be used.

The first stage rocket engine may have swiveling capability with respect to the first stage or other forms of thrust vector control to steer the vehicle.

Figure 1B:
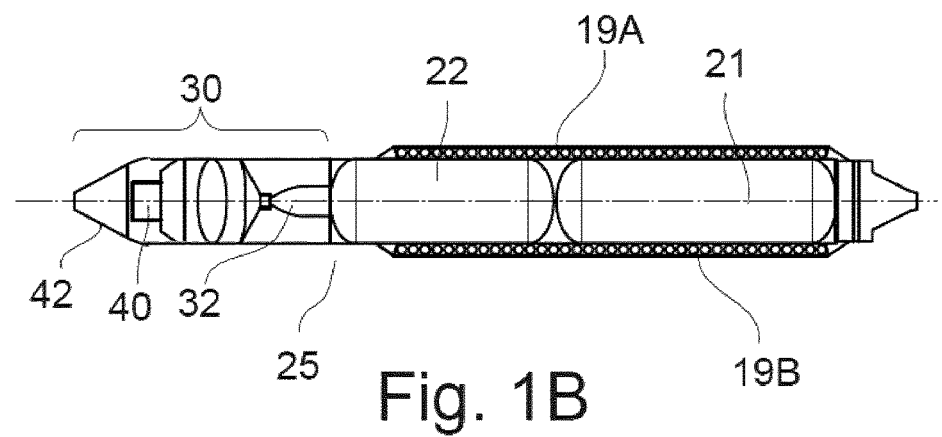

FIG. 1B schematically illustrates a cross-sectional view of space launch vehicle 1. The reusable first stage 10 in this example has a tank 21 for liquid oxygen, and a tank 22 for a liquid fuel. The liquid fuel may be liquid methane in some examples. In alternative examples, the liquid fuel may be kerosene, hydrogen or otherwise.

The second stage 30 in this example includes payload 40 and a payload fairing 42. The payload may be a small satellite. The second stage 30 also includes a second stage rocket engine 32. In this particular example, the second stage rocket engine includes a bell nozzle and may be powered by oxygen and methane.

In further examples, different propellants and rocket engines may be used for the first stage and for the second stage.

The first stage 10 and second stage 30 may be separable at interstage 25. It should be clear that different shapes and arrangements may be foreseen for the stages and interstages. In one alternative example, the first stage may have a rounded nose. Such a rounded nose can make the first stage more suitable for lifting body re-entry. At launch, such a rounded nose may be hidden from sight in the interstage 25. This is merely one possible example.

Figure 1C:
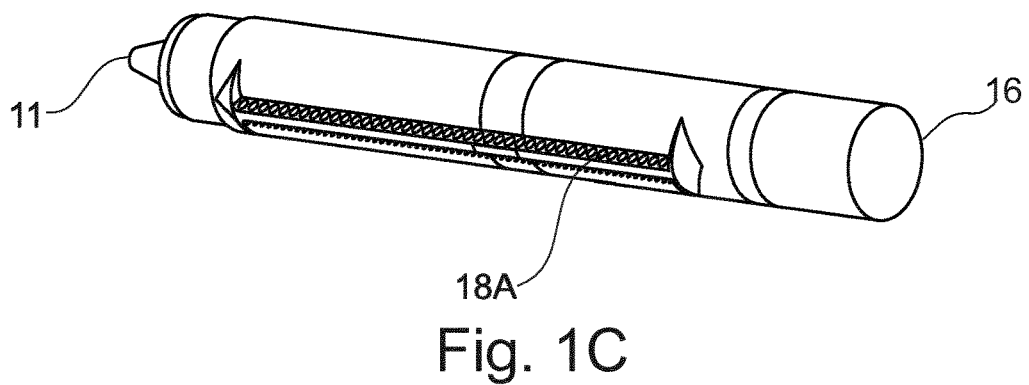

The first stage 10 in this example includes rows 18A and 18B of a plurality of electric ducted fans 18 arranged side by side. In FIG. 1A, the fans 18 are covered by fan covers 19A and 19B. In FIG. 1C, the fan covers have been detached from the cylindrical main body of the first stage. In a specific example, the fan covers may be attached using a plurality of pyrotechnic fasteners, e.g. bolts. After re-entry and in preparation of the landing procedure, explosives in the bolts may be remotely detonated such that the covers are detached from the main body and the ducted fans are uncovered.

In this specific example, a first row 18A and a second row 18B of electric ducted fans are arranged parallel to the longitudinal axis and in diametrically opposite positions of the main cylindrical body.

The number of ducted fans may be adapted depending on e.g. the weight of the reusable stage of the launch vehicle, and the power of the fans. In a launch vehicle according to FIG. 1, the weight of the reusable stage during the landing procedure may e.g. be in a range of 1.500-2.500 kg. The first stage may include e.g. 60-80 ducted fans. The nominal thrust of the fans may be e.g. in the range of 200 to 400 N. In other examples, the first stage may include e.g. a lower number of fans, each with a higher nominal thrust.

Although not illustrated in this specific example, in other examples a least some of the ducted fans can comprise air flow intake guides. The intake guides can be designed to redirect intake air to flow e.g. over the main body or to inhale air from a specific direction.

And although also not illustrated in this specific example, in other example, at least some of the ducted fans have air flow outlet guides. The outlet guides can redirect the outlet air and exhale air in a specific direction or to shield the outlet from incoming air. In an example, the exhaust may be directed such that a horizontal thrust component may be provided.

In further examples, not all ducted fans need to be the same size and the same rated performance. In some examples, ducted fans further away from the centre of gravity may be smaller and may be predominantly used for steering.

Figure 1D:
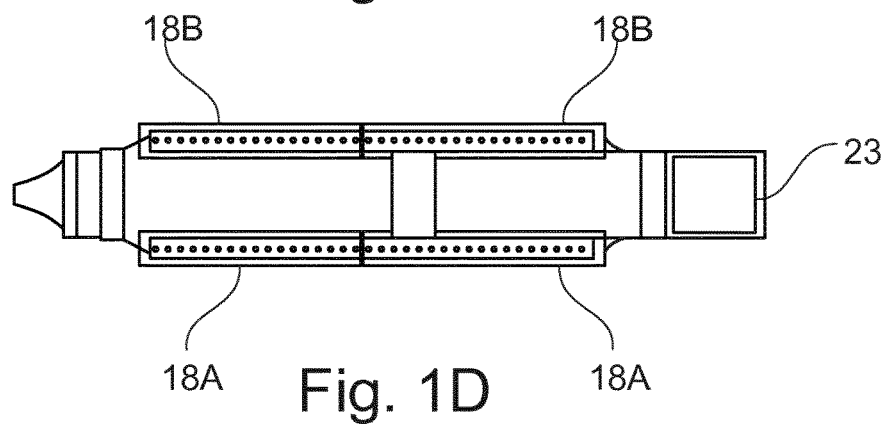

FIG. 1D illustrates how the first row 18A and second row 18B may be divided into four quadrants 18A1, 18A2, 18B1 and 18B2 with respect to the centre of gravity at the time of the landing procedure. Individual control over the four quadrants allow the plurality of fans to be driven like a quadcopter. A quadcopter configuration is used in many unmanned aerial vehicle designs for its control and flight characteristics.

The electric ducted fans may be powered by one or more batteries 23. The batteries 23 in this example may be arranged near the second end 16 of the first stage, i.e., at the opposite end of the first stage rocket engine 11. In the landing procedure, the propellants have been exhausted and the rocket engine provides a mass that is far removed from the geometrical center of the first stage. So that the center of gravity may be arranged relatively close to the geometrical center of the first stage, the batteries 23 may be arranged at the opposite end.

The electric fans or electric ducted fans may additionally or alternatively be powered by an electric generator, which in turn could be powered by e.g. a gas turbine. Such an electric generator might reduce the overall weight of the stage and the launch vehicle.

The exhaust velocity of the air flow through the ducted fans should be high enough to avoid the exhaust air from re-entering the ducted fans when the speed of falling is higher than the exhaust velocity from the ducted fans. The exhaust velocity of the air through the ducted fans may be e.g. 70 m/s or more, and specifically 85 m/s or more.

The ducted fans in some examples may have some swiveling capability. Control capabilities of the reusable stage may be improved by swiveling ducted fans. In further examples, the fans have no swiveling capability in order to increase reliability and reduce weight. In these examples, the ducted fans may be arranged or aligned along fan axes that are not exactly perpendicular to the central longitudinal axis 12. In particular, with reference to FIG. 1D, groups of fans 18B1 and 18B2 may have a different fan axis than groups 18A2 and 18A1.

Figure 1E:
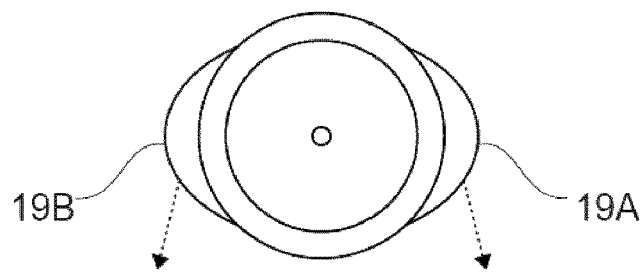

When seen from the front of the launch vehicle (e.g. FIG. 1E), the fan rotational axes (and thus the axes of thrust) may be inclined towards the centre of the launch vehicle. The deviation from the vertical may be e.g. between 2 and 20°, and particularly may be between 4° and 15°. FIG. 1E schematically illustrates the potential thrust from the ducted fans.

FIG. 1E illustrates a top view of the first stage 10. It may be seen in FIG. 1E, that when the first stage is oriented substantially horizontally (i.e. perpendicular to the take-off orientation), a bluff body suitable for re-entry is provided by the combination of the main body and the fan covers 19A and 19B. The re-entry procedure will be commented on later on.

However, it may be seen in FIG. 1E that activation of the fans may create a suction of air flow and thereby an increase in speed of air flow over the surface of stage 10. The aerodynamic flow created over the surface may be used to create additional lift, and the outer surface of stage 10 may be adapted to create such lift. The suction of air flow may also be used to avoid boundary layer separation.

Figure 2:
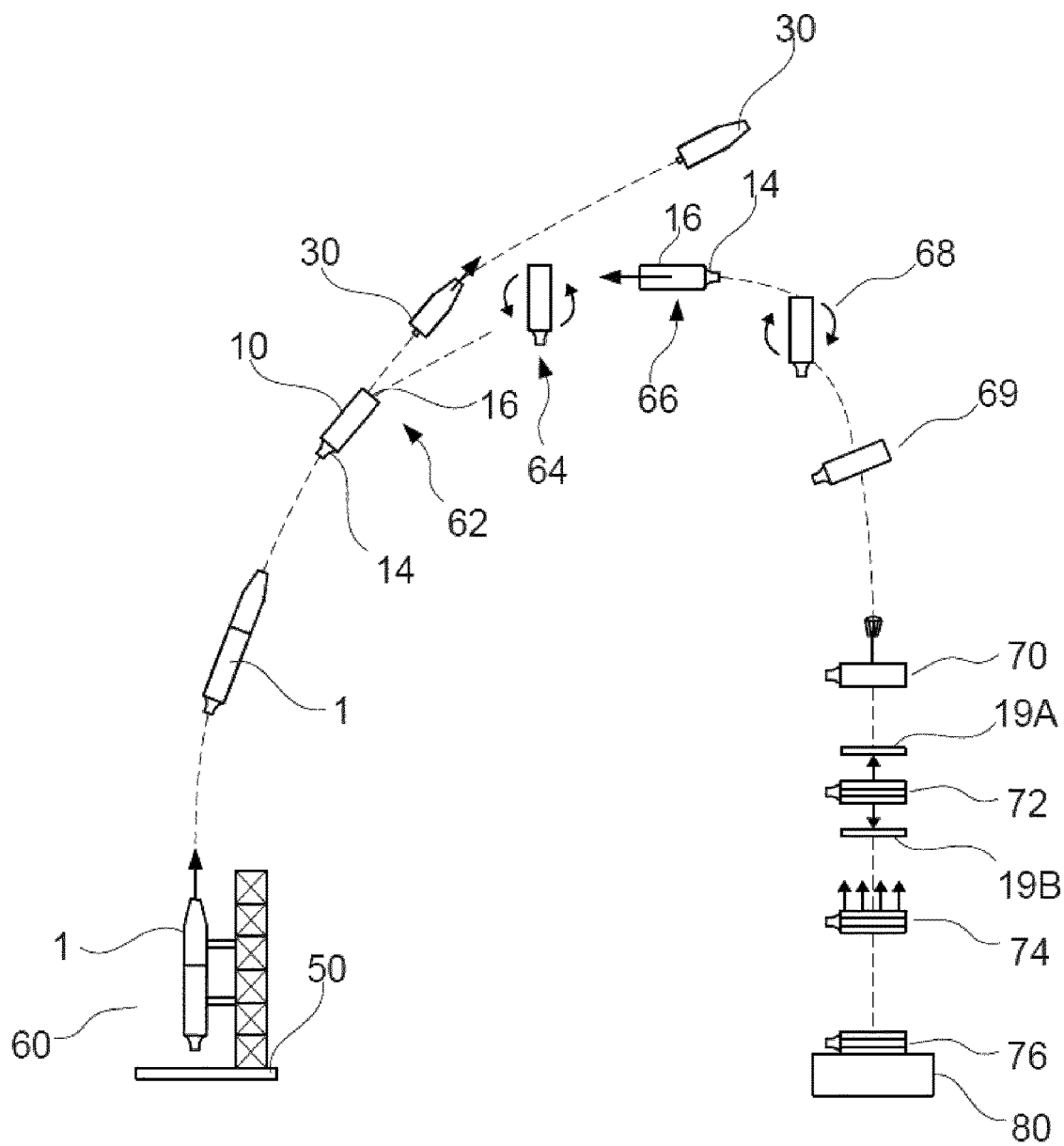
FIG. 2 schematically illustrates an example of a method for transporting a payload to space.

FIG. 2 schematically illustrates an example of a method for transporting a payload to space. The space launch vehicle 1 is arranged substantially vertically for take-off 60 at take-off platform 50. The first stage rocket engine is arranged at the bottom of the space launch vehicle and is ignited to propel the space launch vehicle substantially vertically at take-off.

The trajectory of the space launch vehicle may be slightly steeper than for most expendable launch vehicles. At step 62, the first stage 10 may be separated from the second stage 30. The separation may occur e.g. at a height of 50-150 km, e.g. about 70 km above the earth's surface depending on the mission. The second stage 30 in this example may carry the payload, and a second stage rocket engine. The second stage rocket engine may be powered to bring the payload to its intended orbit. In this specific example, the second stage 30 is shown to have a bell shaped exhaust nozzle. After separation, depending on the mission, the first stage continues an upwards flight to e.g. about 200 km above the earth's surface.

In some examples, an additional payload may be carried in the first stage of the vehicle. In one example, such an additional payload which is returned to earth might relate to micro-gravity experiments.

In examples, the propellants of the first stage may not be exhausted before separation from the second stage. After separation, the first stage of the space launch vehicle may manoeuvre to flip and thereby change its orientation at step 64. To this end, the rocket engine 10 might be powered and thrust vector control may be used. Alternatively or additionally, smaller auxiliary thrusters and/or reaction wheels might be used for the flip manoeuvre.

Both small thrusters and control surfaces may be used in other stages of the mission as well.

After this manoeuvre at step 64, the first stage rocket engine may be ignited for a boost back manoeuvre at step 66. Depending on the flight mission and the position of landing pad 80, the boost back manoeuvre may substantially cancel out the horizontal speed of the first stage, to only partially cancel the horizontal speed of the first stage or to change flight direction of the first stage.

In this specific example, at step 68, a further flip manoeuvre may be performed. The stage 10 may have a substantially horizontal orientation after the second flip manoeuvre. It should be noted that the directions of the flip manoeuvre indicated in the drawings are not intended to be limiting. In any of the flip manoeuvre, the direction may be clockwise or counter-clockwise, or out-of-plane or otherwise.

Re-entry into the earth's atmosphere may occur at step 69. The first stage may fly in a substantially horizontal orientation, i.e. the central longitudinal axis 12 of the first stage may be substantially horizontal or define an angle of less than 30°, and particularly less than 20° with respect to the horizontal. In this orientation, as illustrated in FIG. 1E, the bluff cross-section provides increased air resistance producing a "shock wave" that absorbs much of the vehicle's kinetic energy.

Control surfaces, e.g. grid fins, deltafins, or planar fins may be used for flight control and stability.

After re-entry, at step 70, optionally a passive decelerator may be activated or deployed to slow down the vertical speed of stage 10. The passive decelerator may be textile based such as a parachute or parafoil. The passive decelerator might also be a ballute.

At step 72, the fan covers 19A and 19B may be removed to uncover the ducted fans. Optionally, the ducted fans may be configured to be operated as a generator. I.e. as the stage 10 of the launch vehicle is falling, the fans may be rotated by the air passing through the fans, and this rotation may be used to charge the batteries.

Then the ducted fans may be activated at step 74. It is possible to use the decelerator at the same time as the ducted fans. In this configuration, the lift force required for the stage of the launch vehicle may be partly provided by a decelerator and by the ducted fans.

Control over individual fans, and/or over groups of fans may be used to control the flight of the first stage 10 to land at step 76. The first stage 10 may land in a substantially horizontal configuration at landing pad 80. The landing pad 80 may be land based or seaborne and may be fixed or movable.

For a softer landing, the first stage may include some form of shock absorber or landing gear. Alternatively, one or more shock absorbers may be integrated in the landing platform 80. This way the weight of the space launch vehicle may be smaller and the design of the launch vehicle may be simplified. The landing platform 80 might also be a net or similar that is configured to absorb some of the remaining speed of the first stage of the space launch vehicle.

In alternative examples, a different landing sequence may be carried out. In an example, a method for transporting a payload to space may substantially correspond to the examples hereinbefore described, but at stage 76, instead of landing on a platform or landing pad, the stage with return to base capability may be caught mid-air instead of landing. I.e. a helicopter, drone or other aircraft may catch the stage and then land. Alternatively, the stage 76 may be caught by a hook or arm during the final phase of landing.

Figure 3:
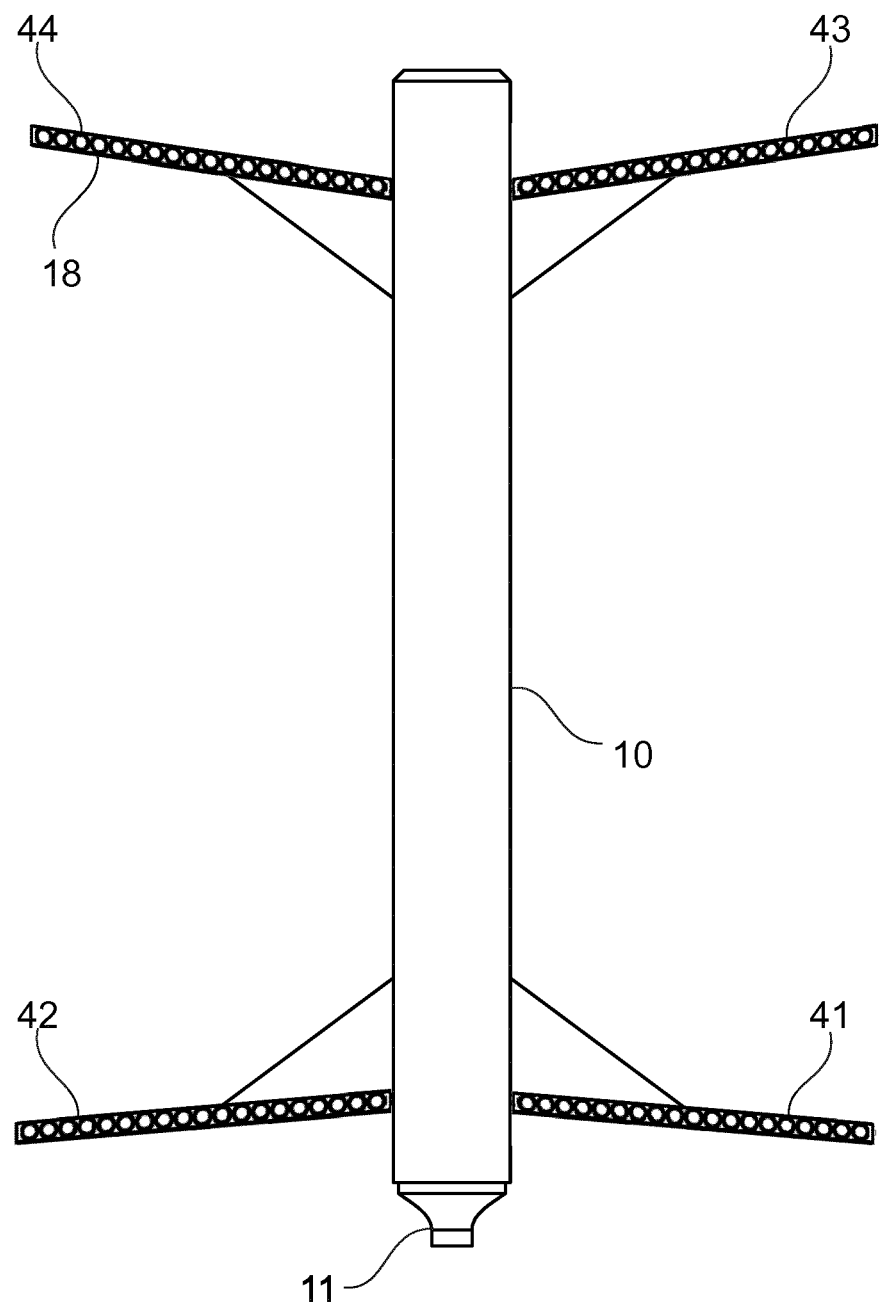
FIG. 3 illustrates a further example of a first stage for a space launch vehicle.

FIG. 3 illustrates a further example of a first stage for a space launch vehicle. The first stage 10 of this example may have several features in common with the example of FIG. 1. However, the plurality of ducted fans may be arranged in four rows of fans. The four rows of fans are arranged along four deployable arms 41, 42, 43 and 44.

The arms may be deployed and folded using actuators involving e.g. motorized drives. The four rows of ducted fans when deployed are further removed from the centre of gravity than in FIG. 1 and thereby improve flight control.

Even though in the disclosed examples, the longitudinal axes of the first and second stages coincided, it should be clear that the present disclosure is not limited to such a configuration. In particular, a booster stage that is side mounted to a stage of the launch vehicle might be used as well. A booster stage may have return to base capability. Furthermore, the present disclosure should not be regarded as limiting regarding the type of rocket engines disclosed, or to which stage(s) of a launch vehicle might be endowed with return-to-base capabilities.

Figure 4:
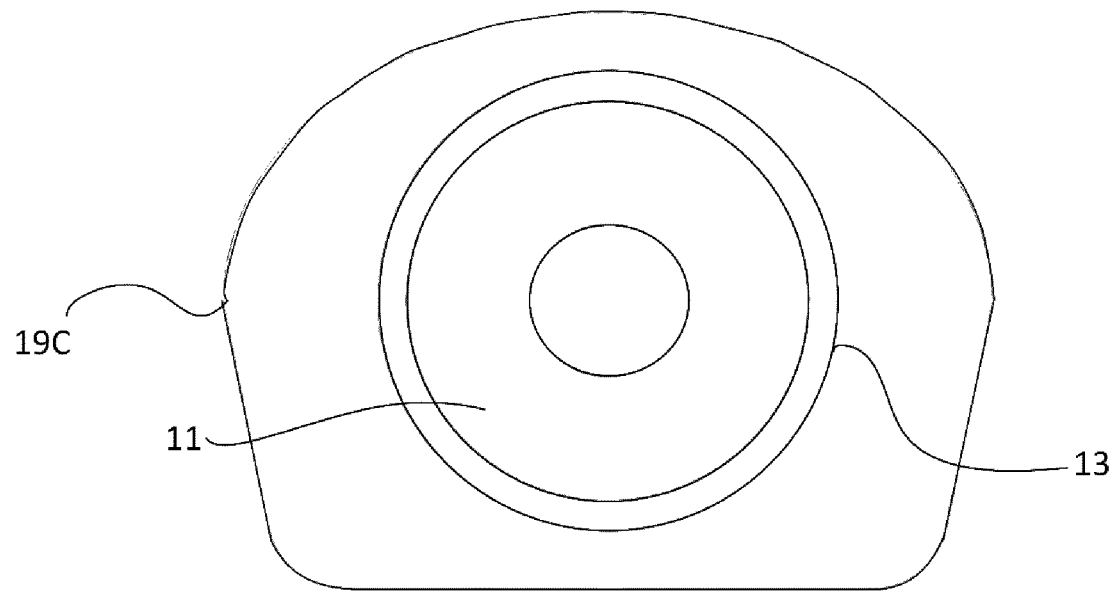
FIG. 4 illustrates a rear view of another example of a stage for a space launch vehicle.

FIG. 4 schematically illustrates another example of a stage of space launch vehicle, the stage having return-to-base capability. FIG. 4 shows a rear view of the stage with rocket engine 11. Rocket engine 11 might be an aerospike engine as in the example of FIG. 1.

Reference sign 13 indicates the substantially cylindrical outer skin of the stage. The outer skin 13 of the stage forms part of the load bearing structure and may form the outer shell of the fuel tanks. In the example of FIG. 4, an aerodynamic cover 19C is provided which serves to cover the fans, e.g the electroducted fans. In this example, contrary to the example of FIG. 1, the aerodynamic cover 19c may substantially surround the outer shell of the fuel tanks. In this example, advantage is taken of the cover of the fans to further affect the aerodynamic shape of the stage in a positive manner. The shape may be adapted, as in FIG. 4 to provide for lift during re-entry.

Figure 5:
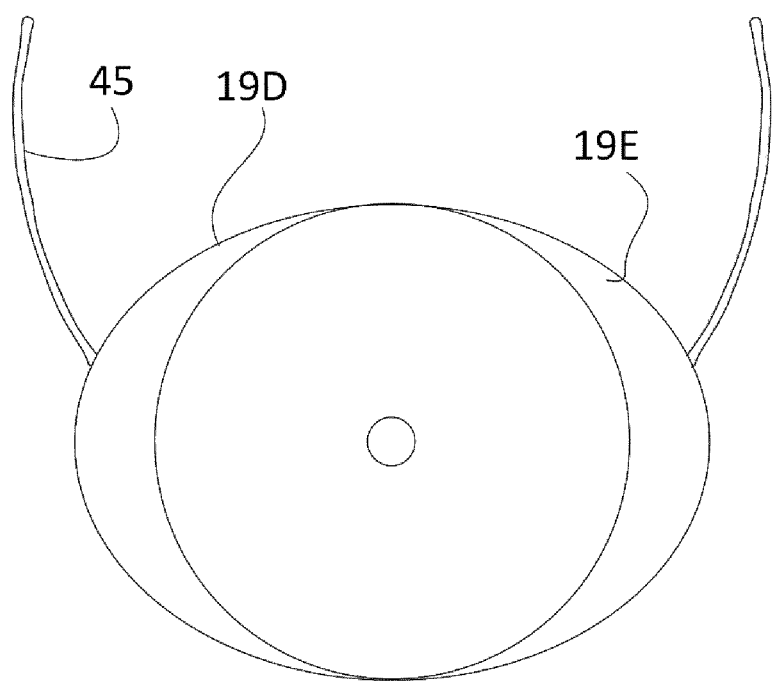
FIG. 5 illustrates a front view of yet a further example of a stage for a space launch vehicle.

FIG. 5 schematically illustrates yet a further example of a stage with return to base capability. In FIG. 5 a front view of the stage is shown. In this example, similar to the example of FIG. 1, covers 19D and 19E are provided to cover the fans. Such covers or part of such covers may be disposed of during flight to uncover the fans, before activating them.

In the example of FIG. 5, parts 45 of the covers 19D, 19E may serve as aerodynamic control surfaces during flight or re-entry. In this example, parts 45 are shown as curved fins which might increase lift and stability for re-entry, but other arrangements are possible. When the covers 19D, 19E are discarded, the corresponding control surfaces 45 may be discarded at the same time.

Even though in the disclosed examples, the fans were shown to be ducted fans, in other examples, propellers, propfans, turboprops or turbofans might be used.

For reasons of completeness, several aspects of the present disclosure are set out in the following numbered clauses:

Clause 1. A stage, particularly a reusable stage, for a space launch vehicle having a main body including a first end and a second end, and defining a central longitudinal axis between the first end and the second end, and the stage comprising:
  a stage rocket engine arranged at or near the first end of the stage to propel the launch vehicle vertically upwards at take-off, and
  a plurality of fans for providing lift during a landing procedure of the stage, wherein the fans have rotational axes arranged substantially perpendicular to the central longitudinal axis.

Clause 2. A stage for a space launch vehicle according to clause 1, wherein the plurality of fans includes a first row of fans arranged side by side and a second row of fans arranged side by side, wherein the first and the second rows are substantially parallel to the central longitudinal axis.

Clause 3. A stage for a space launch vehicle according to clause 2, wherein the main body is cylindrical, and wherein the first row of fans and the second row of fans are arranged in diametrically opposite positions of the main cylindrical body.

Clause 4. A stage for a space launch vehicle according to any of clauses 1-3, wherein one or more of the plurality of fans have a different size from other fans.

Clause 5. A stage for a space launch vehicle according to any of clauses 1-4, wherein the stage further comprises an electric generator for powering the fans.

Clause 6. A stage for a space launch vehicle according to any of clauses 1-5, wherein the stage further comprises one or more batteries for powering the fans.

Clause 7. A stage for a space launch vehicle according to clause 6, wherein the batteries are arranged at or near a second end of the stage.

Clause 8. A stage for a space launch vehicle according to clause 6 or 7, wherein a part of the batteries are configured to be discarded after use.

Clause 9. A stage for a space launch vehicle according to any of clauses 6-8, wherein one or more of the batteries are arranged to be displaced, optionally by sliding and/or swiveling.

Clause 10. A stage for a space launch vehicle according to any of clauses 1-9, further comprising one or more fan covers to cover the fans during portions of a flight of the space launch vehicle.

Clause 11. A stage for a space launch vehicle according to clause 10, wherein the fan covers are configured to be discarded during flight.

Clause 12. A stage for a space launch vehicle according to clause 11, comprising a controlled explosion mechanism for detaching the fan covers.

Clause 13. A stage according to any of clauses—10-12, wherein the main body and the fan covers define a blunt body when viewed transverse to the longitudinal axis.

Clause 14. A stage according to any of clauses 10-13, wherein the fan covers includes fins or control surfaces.

Clause 15. A stage for a space launch vehicle according to any of clauses 1-14, further comprising a control for controlling the plurality of fans, wherein the control is configured to separately control four groups of fans, and wherein the four groups of fans are defined by four quadrants with respect to a centre of gravity of the first stage during the landing procedure.

Clause 16. A stage for a space launch vehicle according to any of clauses 1-15, wherein the stage rocket engine is an aerospike engine, and optionally an aerospike engine with a toroidal combustion chamber.

Clause 17. A stage for a space launch vehicle according to any of clauses 1-16, comprising tanks for a first and a second liquid propellant, and optionally wherein the first liquid propellant is liquid oxygen, and the second liquid propellant is liquid methane.

Clause 18. A stage according to clause 17, further comprising pumps for pumping liquid propellant to the stage engine.

Clause 19. A stage according to clause 18, wherein one or more batteries for powering the pumps are configured to power the fans.

Clause 20. A stage according to any of clauses 17-19, wherein liquid propellant lines are arranged such that the liquid propellant can cool batteries and/or electrical conductors.

Clause 21. A stage according to any of clauses 1-20, wherein the fans comprise one or more propellers.

Clause 22. A stage according to any of clauses 1-21, wherein the fans comprise one or more turboprops.

Clause 23. A stage according to any of clauses 1-22, wherein the fans comprise one or more propfans.

Clause 24. A stage according to any of clauses 1-23, wherein the fans comprise one or more turbofans.

Clause 25. A stage according to any of clauses 1-24, wherein the fans comprise one or more ducted fans.

Clause 26. A stage according to clause 25, wherein one or more of the ducted fans comprise air flow intake guides.

Clause 27. A stage according to clause 25 or 26, wherein one or more of the ducted fans have air flow outlet guides.

Clause 28. A stage for a space launch vehicle according to any of clauses 1-27, further comprising a decelerator.

Clause 29. A stage for a space launch vehicle according to any of clauses 1-83, further comprising fins or one or more control surfaces for steering the stage.

Clause 30. A stage for a space launch vehicle according to any of clauses 1-29, further comprising a landing gear.

Clause 31. A stage according to any of clauses 1-30, wherein the stage is a first stage of a launch vehicle.

Clause 32. A stage according to any of clauses 1-30, wherein the stage is a second stage of a launch vehicle.

Clause 33. A stage according to any of clauses 1-32, wherein the stage is a booster stage of a launch vehicle.

Clause 34. A space launch vehicle comprising a stage according to any of clauses 1-33.

Clause 35. A space launch vehicle comprising a first stage according to clause 31 and further comprising a second stage, wherein the second stage comprises a second stage engine for propelling the second stage.

Clause 36. A space launch vehicle according to clause 35, wherein the second stage engine comprises a bell nozzle.

Clause 37. A space launch vehicle according to clause 35 or 36, wherein the second stage carries a payload, and wherein the payload optionally is a satellite.

Clause 38. A system for space transportation including a space launch vehicle according to any of clauses 34-37, and further comprising a landing platform.

Clause 39. A system according to clause 38, wherein the landing platform comprises one or more shock absorbers.

Clause 40. A system according to clause 38 or 39, wherein the landing platform is seaborne.

Clause 41. A system according to clause 38 or 39, wherein the landing platform is land-based.

Clause 42. A method for transporting a payload to space comprising:
providing a space launch vehicle comprising a reusable stage according to any of clauses 1-33;
arranging the payload in the space launch vehicle;
launching the space launch vehicle by igniting the rocket engine;
directing the reusable stage to descend; and
landing the reusable stage by powering the fans.

Clause 43. A method according to clause 42, wherein the landing of the reusable stage comprises orienting the reusable stage so that the longitudinal central axis is substantially horizontal.

Clause 44. A method according to clause 42 or 43, wherein the landing comprises the reusable stage being caught in mid-air.

Clause 45. A method according to any of clauses 42-44, wherein the space launch vehicle comprises a further stage carried by the reusable stage and having a further stage engine, and the method comprises:
separating the reusable stage from the further stage; and
propelling the further stage.

Clause 46. A method according to clause 45, wherein the payload is arranged in the further stage.

Clause 47. A method according to any of clauses—42-46, wherein directing the reusable stage to descend includes igniting the reusable stage engine.

Clause 48. A method according to any of clauses 42-47, further comprising decelerating the reusable stage before powering the fans.

Clause 49. A method according to any of clauses 42-48, wherein landing the reusable stage by powering the fans includes using a decelerator simultaneously with the powering of the fans.

Clause 50. A method according to any of clauses 42-50, wherein the reusable stage is the first stage of the space launch vehicle.

Clause 51. A method according to any of clauses—45-50, wherein the reusable stage is a first stage of the space launch vehicle and the further stage is a second stage of the space launch vehicle.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A reusable stage for a space launch vehicle, the reusable stage having a main body including a first end and a second end, and defining a central longitudinal axis extending between the first end and the second end along a length of the main body, and the reusable stage further comprising:
a reusable stage rocket engine arranged at or near the first end of the reusable stage to propel the launch vehicle vertically upwards at take-off, and
a plurality of electrically powered fans for providing lift during a landing procedure of the stage, wherein the plurality of fans includes a first row of fans arranged side by side and a second row of fans arranged side by side, wherein the first and the second rows are substantially parallel to the central longitudinal axis, wherein the main body is cylindrical, wherein the first row of fans and the second row of fans are arranged in diametrically opposite positions of the main cylindrical body, and wherein the fans of the first row have rotational axes arranged substantially perpendicular to the first row and the fans of the second row have rotational axes arranged substantially perpendicular to the second row.

2. The reusable stage for a space launch vehicle according to claim 1, wherein the reusable stage further comprises one or more batteries for powering the fans.

3. The reusable stage for a space launch vehicle according to claim 2, wherein the one or more batteries are arranged at or near the second end of the reusable stage.

4. A reusable stage for a space launch vehicle having a main body including a first end and a second end, and defining a central longitudinal axis extending between the first end and the second end along a length of the main body, and the reusable stage further comprising:
a reusable stage rocket engine arranged at or near the first end of the reusable stage to propel the launch vehicle vertically upwards at take-off, and a plurality of electrically powered fans for providing lift during a landing procedure of the stage, wherein the fans have rotational axes substantially perpendicular to the central longitudinal axis, and further comprising one or more fan covers to cover the fans during portions of a flight of the space launch vehicle.

5. The reusable stage for a space launch vehicle according to claim 4, wherein the fan covers are configured to be discarded during flight.

6. The reusable stage for a space launch vehicle according to claim 1, comprising tanks for a first and a second liquid propellant, and further comprising one or more pumps for pumping liquid propellant to the stage engine, and wherein one or more batteries for powering the pumps are configured to power the fans.

7. The reusable stage for a space launch vehicle according to claim 4, wherein the main body and the fan covers define a blunt body when viewed transverse to the longitudinal axis.

8. The reusable stage for a space launch vehicle according to claim 1, wherein the fans are ducted fans and wherein the ducted fans have ducts arranged substantially parallel to the rotational axes of the fans.

9. The reusable stage for a space launch vehicle according to claim 1, wherein the reusable stage is a first stage of a launch vehicle.

10. A space launch vehicle comprising the first stage according to claim 9 and further comprising a second stage, wherein the second stage comprises a second stage engine for propelling the second stage.

11. The space launch vehicle according to claim 10, wherein the second stage carries a payload, and wherein the payload optionally is a satellite.

12. A method for transporting a payload to space comprising:
providing a space launch vehicle, comprising a reusable stage having a main body including a first end and a second end, and defining a central longitudinal axis between the first end and the second end along a length of the main body, and the reusable stage further comprising:
a reusable stage rocket engine arranged at or near the first end of the reusable stage to propel the launch vehicle vertically upwards at take-off, and
a plurality of electrically powered fans for providing lift during a landing procedure of the stage, wherein the fans have rotational axes arranged substantially perpendicular to the central longitudinal axis; and the method further comprising:
arranging the payload in the space launch vehicle;
launching the space launch vehicle by igniting the reusable stage rocket engine;
directing the reusable stage to descend; and
landing the reusable stage by powering the fans, wherein the landing of the reusable stage comprises orienting the reusable stage so that the longitudinal central axis of the reusable stage is substantially horizontal.

13. The method according to claim 12, wherein directing the reusable stage to descend includes igniting the reusable stage engine.

14. The method according to claim 12, further comprising decelerating the reusable stage before powering the fans.

15. The reusable stage for a space launch vehicle according to claim 1, further comprising one or more control surfaces for steering the stage.

16. The reusable stage for a space launch vehicle according to claim 9, wherein the reusable stage rocket engine is an aerospike engine.

17. The reusable stage for a space launch vehicle according to claim 16, wherein the aerospike engine has a toroidal combustion chamber.

18. The reusable stage for a space launch vehicle according to claim 4, wherein the fans are ducted fans and wherein the ducted fans have ducts arranged substantially parallel to the rotational axes of the fans.

19. The reusable stage for a space launch vehicle according to claim 4, wherein the reusable stage further comprises one or more batteries for powering the fans,
tanks for a first and a second liquid propellant, and
one or more pumps for pumping liquid propellant to the stage engine, and wherein the one or more batteries for powering the fans are configured to power the one or more pumps.

20. The reusable stage for a space launch vehicle according to claim 19, wherein the one or more batteries are arranged at or near the second end of the reusable stage.

* * * * *